(12) United States Patent
Cardno

(10) Patent No.: US 10,095,665 B2
(45) Date of Patent: Oct. 9, 2018

(54) METHODS, APPARATUS AND SYSTEMS FOR DATA VISUALISATION AND RELATED APPLICATIONS

(71) Applicant: New BIS Safe Luxco S.à r.l, Luxembourg (LU)

(72) Inventor: Andrew John Cardno, San Diego, CA (US)

(73) Assignee: New BIS Safe Luxco S.à r.l, Luxembourg (LU)

( * ) Notice: Subject to any disclaimer, the term of this patent is extended or adjusted under 35 U.S.C. 154(b) by 62 days.

(21) Appl. No.: 14/453,192

(22) Filed: Aug. 6, 2014

(65) Prior Publication Data

US 2015/0046795 A1    Feb. 12, 2015

Related U.S. Application Data

(60) Provisional application No. 61/862,728, filed on Aug. 6, 2013.

(51) Int. Cl.
| | |
|---|---|
| *G06F 17/21* | (2006.01) |
| *G06F 17/24* | (2006.01) |
| *G06T 11/20* | (2006.01) |
| *G06F 17/30* | (2006.01) |

(52) U.S. Cl.
CPC .......... *G06F 17/212* (2013.01); *G06F 17/248* (2013.01); *G06F 17/30554* (2013.01); *G06T 11/206* (2013.01); *G06T 2210/32* (2013.01)

(58) Field of Classification Search
CPC .... G06F 17/212; G06F 17/248; G06F 17/211; G06F 17/24; G06F 17/30554; G06F 17/02; G06T 11/206; G06T 2210/32
USPC ......................................................... 715/243
See application file for complete search history.

(56) References Cited

U.S. PATENT DOCUMENTS

| | | | |
|---|---|---|---|
| 8,683,389 B1 * | 3/2014 | Bar-Yam | G06F 3/0481 715/712 |
| 2004/0015783 A1 * | 1/2004 | Lennon | G06F 17/30389 715/235 |
| 2005/0060647 A1 * | 3/2005 | Doan | G06F 17/30554 715/205 |
| 2011/0270804 A1 * | 11/2011 | Hadar | G06F 8/35 707/684 |

* cited by examiner

*Primary Examiner* — Scott T Baderman
*Assistant Examiner* — Hassan Mrabi
(74) *Attorney, Agent, or Firm* — Merchant & Gould P.C.

(57) ABSTRACT

A method of arranging a data set for graphical analysis in a graphical analysis computing system, is described, the method comprising the steps of a data retrieval engine retrieving data elements from a data store that forms part of or which is in communication with the graphical analysis computing system; a processing module carrying out a preliminary analysis of the retrieved data, forming an initial appropriate output style as a visual document framework, carrying out analysis of the retrieved data for periodic or repeating patterns and adjusting the visual document framework to emphasize desired visual attributes, and mapping the data on to the visual document framework; and a rendering engine creating a visual document output display.

10 Claims, 12 Drawing Sheets

METHODS, APPARATUS AND SYSTEMS FOR DATA VISUALISATION AND RELATED APPLICATIONS

RELATED APPLICATIONS

This application claims benefit of U.S. Provisional Ser. No. 61/862,728, filed 6 Aug. 2013 and which application is incorporated herein by reference. To the extent appropriate, a claim of priority is made to the above disclosed application.

FIELD OF THE INVENTION

The present invention relates to methods, apparatus and systems for temporal data visualisation and related applications.

BACKGROUND

A chart or graph is a type of information graphic or graphic organizer that represents tabular numeric data and/or functions in a form that makes it easier to understand large quantities of data and the relationship between different parts of the data. Many tools exist to help the user construct very sophisticated representations of data. It is known to use charting wizards such as those that are available in Excel and various other systems such as those provided by, for example, IBM.

In addition there are multiple Business Intelligence (BI) tools available that enable users to analyze data in an attempt to create meaningful feedback. However, as the amount of data increases, the necessary complexity of the visual representations created by the analysis of the data also increases, and this can end up swamping that part or parts of the visual representation that is/are most required and relevant to an end user. This can be particularly problematic where a user is required to choose the form of the display (e.g. heatmap, bar chart, etc) and display detail (e.g. scale of the axes), and then manually input and subsequently adjust the parameters which lead to an output display. A user must manually assess, estimate or guess what patterns may lie within the data, and once a first iteration an output is complete, to alter or refine the output result manually. This problem can be particularly acute where a user wishes to assess data periodically or over a series of time periods. There may be repeating or similar patterns in the data. However, these may not align with or fit a standard temporal pattern (e.g. a week, month, quarter or year). A user is required to guess or estimate factors such as timescales in order that the data output is visualised in a manner that allows the business measures to be assessed. The sophisticated visualisation algorithms are not generally provided to a user in a manner that enables the user to easily pick the data to be represented, to pick the correct summaries of the data, to pick the right dimensions to be represented, to pick the right forms of visual representation, or choose unique visual designs to create a collection of visualisations that help someone run their business.

Charts, graphs, etc. can generally be referred to as Visual Documents. A Visual Document contains visual representations of data. A Business Performance Driver is a business metric used to quantify a business objective. Visual Documents, are constructed by applying Business Performance Driver(s) (BPD) data to a specific Visual Design.

A Visual Document is designed to illustrate at least one specific point (using the visualisation), support the points made with empirical evidence, and may be extended to provide recommendations based on the points made. The Visual Document is the actual deliverable from the software to the software user. The Visual Document is fed by data and a metadata database that stores definitions of the BPDs—the BPDs are the focus of the Visual Document. The Visual Document refers to the final item, which is made up of a Visual Document Framework which had data plotted onto it.

Various other references to the prior art and its associated problems are made throughout the following description. The present invention aims to overcome, or at least alleviate, some or all of the mentioned problems, or to at least provide the public with a useful choice.

SUMMARY OF THE INVENTION

The term "comprising" as used in this specification and indicative independent claims means "consisting at least in part of". When interpreting each statement in this specification and indicative independent claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

In a first aspect the present invention provides a graphical analysis computing system, a method of arranging a data set for graphical analysis, the method comprising the steps of:
  a. a data retrieval engine retrieving data elements from a data store that forms part of or which is in communication with the graphical analysis computing system;
  b. a processing module:
    i. carrying out a preliminary analysis of the retrieved data,
    ii. forming an initial appropriate output style as a visual document framework,
    iii. carrying out analysis of the retrieved data for periodic or repeating patterns and adjusting the visual document framework to emphasise desired visual attributes, and
    iii. mapping the data on to the visual document framework; and
  c. a rendering engine creating a visual document output display.

In a further aspect the present invention provides a graphical analysis computing system, a method of graphically displaying a data set for graphical analysis, the method comprising the steps of:
  a. a data retrieval engine retrieving data elements from a data store that forms part of or which is in communication with the graphical analysis computing system;
  b. a processing module:
    i. developing a plurality of spatial representations of the data elements wherein a dimension of each spatial representation has a different periodicity,
    ii. determining visual attributes of the spatial representations, and
    iii. selecting one or more spatial representations having visual attributes satisfying selection criteria; and
  c. a rendering engine creating a visual document output display for the one or more selected spatial representations.

BRIEF DESCRIPTION OF THE DRAWINGS

Embodiments of the present invention will now be described, by way of example only, with reference to the accompanying drawings, in which.

DETAILED DESCRIPTION OF THE INVENTION

Figure 1A:
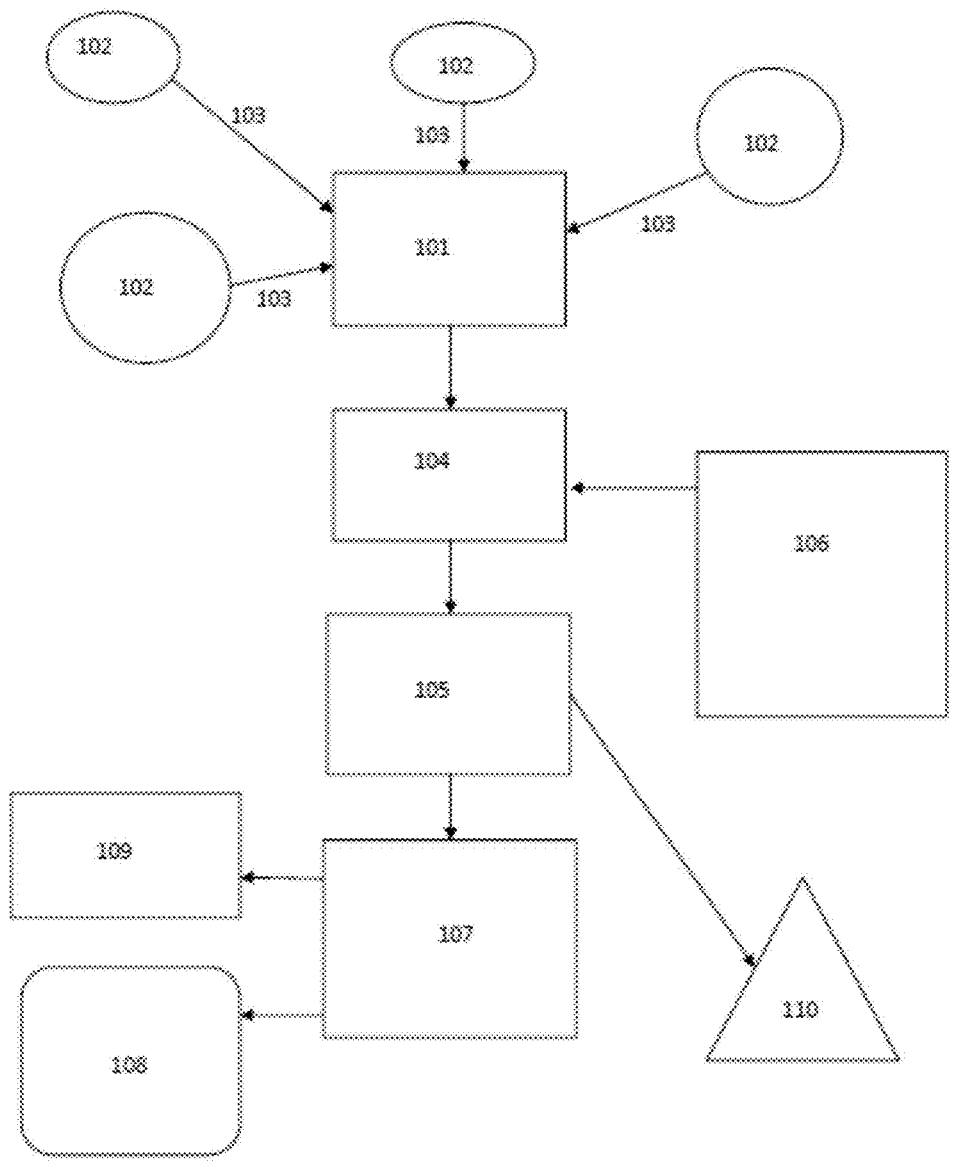
FIG. 1a shows a schematic overview of the architecture of a system suitable for use with the preferred embodiments, with the main building blocks or system elements and the main connections between these elements shown.

The following described invention is suitable for use in conjunction with other methods, and the incorporation into one or more systems, for example as described in 'Methods, apparatus and systems for data visualisation and related applications' (earlier filed by the applicant in the entirety as U.S. provisional patent application Ser. No. 61/074,347, filed on 20 Jun. 2008), and in 'Methods, apparatus and systems for data visualisation and related applications' (earlier filed by the applicant in the entirety as U.S. provisional patent application Ser. No. 61/120,194, filed on 5 Dec. 2008), both of which are hereby incorporated by reference.

General Overview

According to various embodiments of the present invention, systems and methods are herein described in which the types of data elements in a dataset or datasets are first assessed or determined, and a graphical output is then generated with at least one repeating or periodic scale. The output type can be chosen automatically, or set by the user. The output is automatically assessed against a desired visual attribute, and the periodicity automatically adjusted through one or more iterations to align the output as closely as possible to the desired visual attribute.

Although the various specific embodiments described below are in relation to the representation of data in various desirable forms, it will be understood that the methods and systems described may also be applied to any other suitable graphical representation method or methods.

System Hardware Overview

The methods and systems described may be utilised on any suitable data visualisation system where measured data values or data points are displayed using various different formats based on the data value itself or a range of values in which the data value lies (e.g. bar chart, pie chart, scatter plot, line chart, heat map, box spiral, spiral plot etc).

According to the embodiments described below, a data sorting and visualisation computing system utilises the methodology of the invention using various modules and engines.

The data sorting and visualisation system includes at least a processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the data sorting and visualisation system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions enable the various methods of performing the invention as described herein to be performed. The program instructions, may be developed or implemented using any suitable software programming language and toolkit, such as, for example, a C-based language and compiler. Further, the program instructions may be stored in any suitable manner such that they can be transferred to the memory device or read by the processor, such as, for example, being stored on a computer readable medium. The computer readable medium may be any suitable medium for tangibly storing the program instructions, such as, for example, solid state memory, magnetic tape, a compact disc (CD-ROM or CD-R/W), memory card, flash memory, optical disc, magnetic disc or any other suitable computer readable medium.

The data sorting and visualisation system is arranged to be in communication with data storage systems or devices (for example, external data storage systems or devices) in order to retrieve the relevant data.

It will be understood that the system herein described includes one or more elements that are arranged to perform the various functions and methods as described herein. The embodiments herein described are aimed at providing the reader with examples of how various modules and/or engines that make up the elements of the system may be interconnected to enable the functions to be implemented. Further, the embodiments of the description explain, in system related detail, how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein, and that certain modules or engines may be combined into single modules or engines.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using, any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general purpose computing system specifically programmed to perform the described steps. Alternatively, the methods described herein may be implemented using a specific computer system such as a data sorting and visualisation computer, a database query computer, a graphical analysis computer, a gaming data analysis computer, a manufacturing data analysis computer, a business intelligence computer etc., where the computer has been specifically adapted to perform the described steps on specific data captured from an environment associated with a particular field.

It will be understood that the visual representations produced by the herein described system are specifically adapted to enable the visual representation of complex data in order to convey useful information while minimizing the use of production printing materials or limiting the space in which the information may be conveyed. That is, by enabling the herein described system to produce a visual representation that has one or more characteristics as described to summarize a complex problem or complex data, a number of technical advantages are immediately provided. For example, the characteristics of the visual representation may include the limitation of the size of the visual representation, the use of a minimum amount of ink, or the creation of the representation using a minimal or bounded area space or minimum amount of time. These characteristics then may solve one or more problems such as the excessive consumption of consumable items by reducing the required consumption of consumables such as paper and ink resources, as well as reducing the energy required to produce the printouts of the visual representations or the displaying of the information on a display module due to the ability to provide the required information in a visual space of a smaller size.

System Architecture Overview

FIG. 1a shows a simple schematic overview of the architecture of a system suitable for the preferred embodiments, with the main building blocks or system elements and the main connections between these elements shown. A data store 101 is shown. The data store 101 can be an enterprise data warehouse, an operational data store, a data mart, a storage array, or similar, and can be of the type which receives and stores data from multiple sources 102, which may be widely geographically separated. Further, the data store may be a cache memory used to temporarily store incoming data captured in real time—for example streaming data. The data store may also be a central location, or a distributed network. As examples (but not limited to these), the data sources 102 could be ATMs, and the data could relate to the use of these ATMs. Alternative examples are vending machines and the use thereof, cell phone cells and cell phone use, gaming machines and their use, product sales from individual outlets, take-up of a particular service, stock or commodity prices, currency exchange rates, etc. Some or all of the data from these point-of-service machines could be uploaded automatically to the data store 101 via a network. There may be several different types of particular data associated with each individual entry. For example, for ATM use each individual withdrawal might make up a data element, and the machine location, the time of use and the amount withdrawn could be associated with each individual use or data element. For cell phone use, each individual call might make up an individual data element, with location, time and call duration associated with the individual data element. Similarly, game machine use could record an individual transaction, such as an individual 'buy-in' or use, with the monetary amount, the time of use, and the machine location all associated with this individual data element. It can be seen that other data elements can be iterated from these: frequency of use (e.g. for ATMs or gaming machines), locational density (e.g. number of cell phone calls made from or to a particular cell), user usage frequency (every time an individual user uses a service), etc. The data can be sent to the data store 101 from the sources 102 by way of any suitable communication system 103—for example, wireless transmission, transmission via an established telephone network (mobile or landline), via a built-in hardwired grid, etc. A data retrieval engine 104 is in communication with the data store 101 to enable the stored data to be retrieved and transferred to other elements of the system. A processing module 105 is in communication with the data retrieval engine to receive the data and process this as outlined below. The data retrieval engine 104 and processing module 105 are in communication with external inputs from a terminal or interface 106 which can be, for example, a user interface for inputting commands or inserting programs or code. A rendering engine 107 is in communication with the processing module 105. The rendering engine 107 is arranged to render the data elements to create a Visual Display on an image space on an output device 108 as instructed by the processing module 105. For example, the rendering engine 107 would receive instructions to create a graph, and in accordance with the received instructions, would create the graph on the output device 108 and plot the data points or elements in the locations specified by the processing module 105. A printer element 109 is also shown in parallel with the rendering engine 107 and the output device 108. The printer device 109 can be used to produce hardcopy of the result of the application of the style sheet to the retrieved data elements by the processing module 105. The rendering engine 107 can be adapted to produce outputs suitable for both on-screen/on-line, and hardcopy or print output. Also shown is a transmission unit 110. The transmission unit 110 can take the output of the processing module and transmit this in a suitable format—e.g. as an e-mail to a smartphone, suitably formatted for reading via e-mail.

Figure 1B:
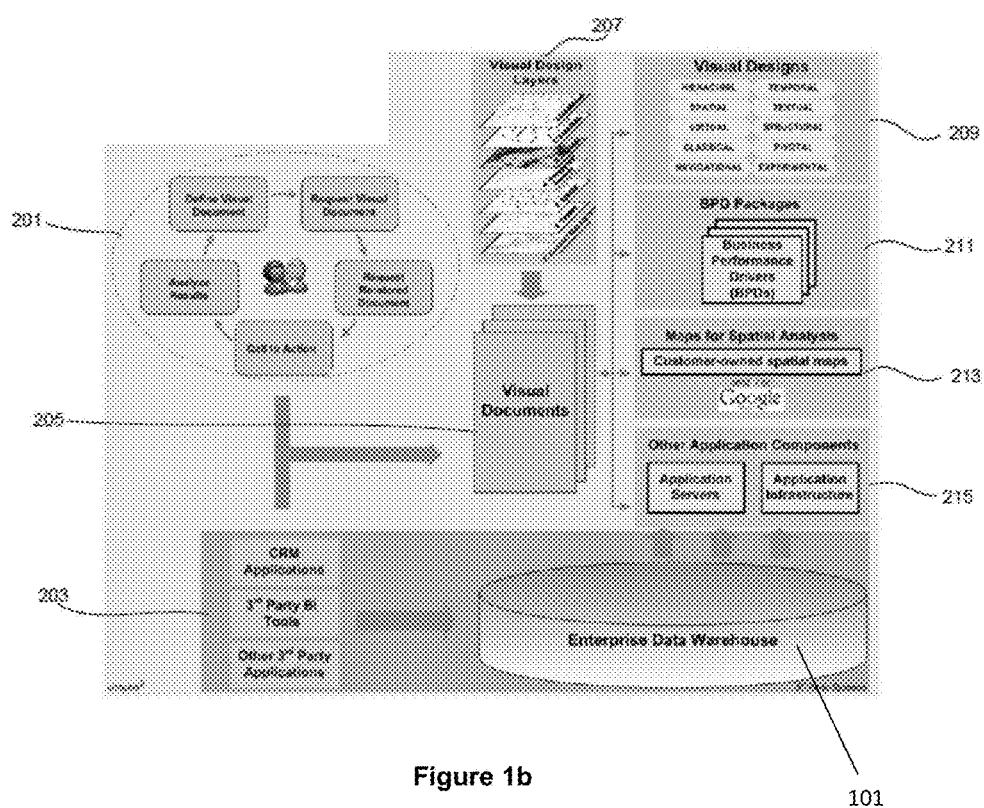
FIG. 1b shows an alternative schematic representation of the architecture of a system suitable for use with the preferred embodiments, with detail of the main building blocks or system elements and the main connections between these elements shown.
Figure 2:
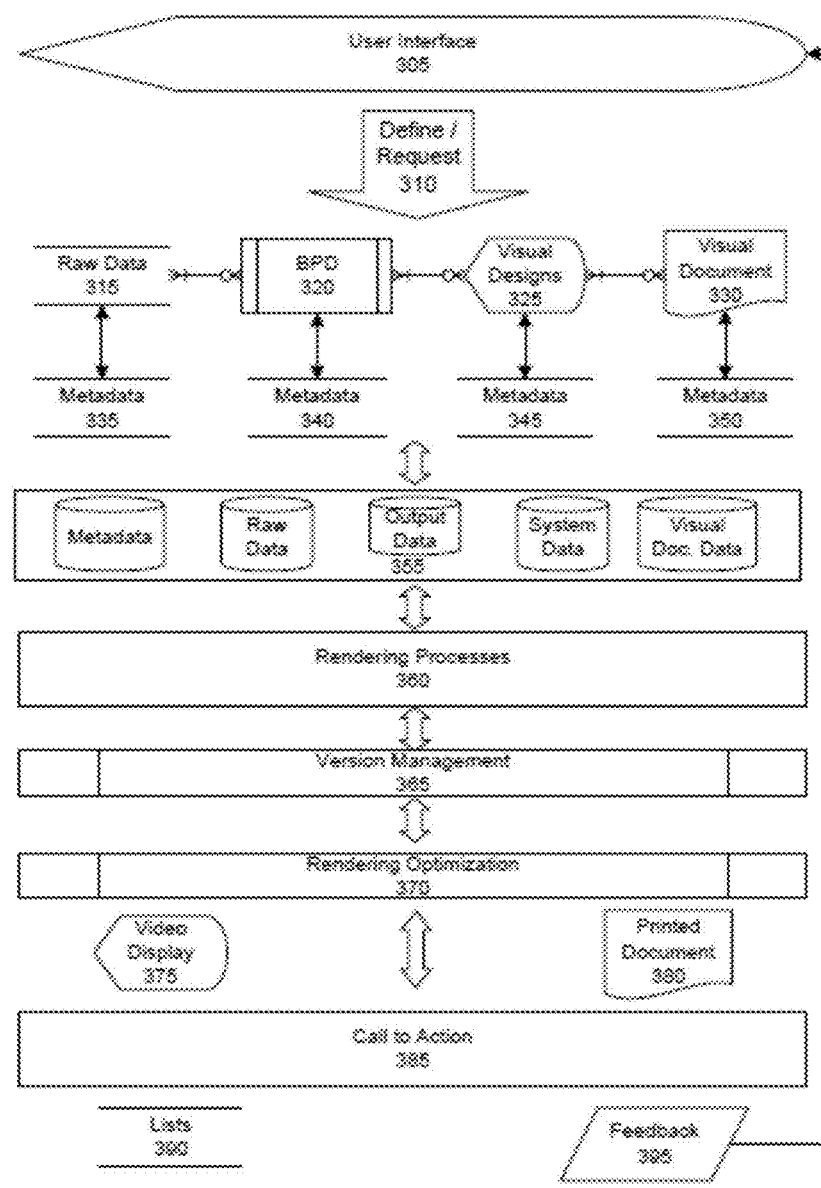
FIG. 2 shows a general overview of the data flow within the system according to an embodiment of the present invention.

FIG. 1b shows an alternative overview of the architecture of a system suitable for the preferred embodiments, with alternative detail of the system shown. A system (data retrieval engine 104, in communication with the data store 101 and the processing module 105) identifies incoming user tasks 201 from input(s) from a terminal or interface 106 (not shown on FIG. 1b). These take the form of defining visual documents, requesting visual documents, requesting rendered documents, calls to action, and analyzing results. These tasks are then detected by the system in conjunction with other systems 203 (these other systems can include CRM applications, third party Business Intelligence (BI)

Tools and other third party applications, all of which may access data stored in the data store 101). The visual design layer concept 207 may be utilized within the visual documents 205. The creation of the visual documents is made in conjunction with a number of different defined visual design types 209, BPD packages 211, spatial analysis maps 213 and other application components 215, such as application servers and application infrastructure.

It will be understood that the query resolving module (processing module 105) may use an extension of SQL to calculate temporal or relationship functions, and so build the queries. Also, the processing module 105 may use metadata to provide sensible or common-sense defaults in order to calculate temporal or relationship functions for the interpretation of results. The processing module 105 may include a rules engine that is used to resolve queries giving an answer that is most likely to be correct based on a set of rules applied to the engine. The system can be adapted to use an extended set of SQL statements (i.e. they extend beyond the basic functions) to build an SQL language where the resolution of the temporal functions and relationships are expressed in the language and executed by the processing module 105 or other database engine that understands the query. Therefore it can be seen that visual or query results may be produced as a result of an extended SQL query against an extended relational database.

Figure 3A:
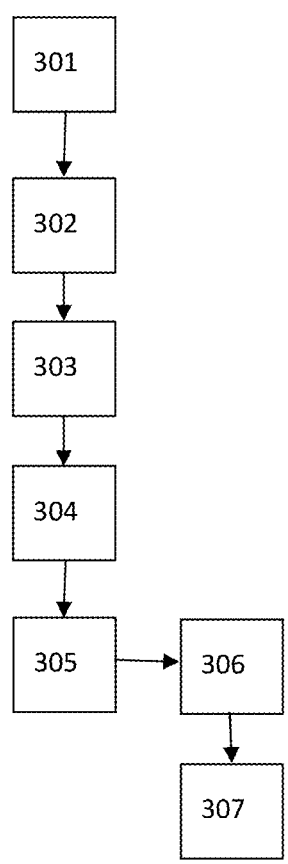
FIG. 3a shows a flow diagram of the method according to embodiments of the present invention.

FIG. 3a shows a partial view of a flow diagram of a method according to an embodiment of the present invention.

Firstly, in step 301, a user enters the required fields via the terminal or interface 106. In the second step 302, the data retrieval engine 104 retrieves the data elements from the data store 101. The data elements retrieved could be, for example: a date range or ranges, number or units of sales, incidents of use over a time period, locations, etc. There can also be sub-fields associated with the main fields—for example, the date range could return data relating to sales over the range of a year or years, with further sub-detail of sales per month, week or day within that particular range. Incidents of use could be numbered per week, with further sub-detail showing incidents of use per day (every 24 hours), and sub-sub-detail of the timing of incidents of use within that period. This level of detail can be useful for pattern analysis. For example, when analysing usage, weekday usage may be heavier or lighter than weekend use, and this can be useful for planning maintenance or developing sales strategies. Generally a user will request data elements within certain upper and lower limits—for example data between two dates.

Once the requested data set has been retrieved from the data store 101, the types of data elements in the retrieved set are determined or assessed in step 303. Particular examples of the types of data elements which could be retrieved and assessed are outlined below in the preferred embodiments. Next, in step 304, the processing module 105 assesses the data and the user commands, and either automatically chooses an output style/axes and scale(s), or defers to the user-chosen style(s). In step 305, the processing module 105 maps/plots the data onto the grid, graph or other Visual Document Framework, and then communicates this to the rendering engine (step 306), which creates the output visual document in step 307.

The outputted visual representation in step 307 above may be displayed in a number of different ways, such as on a colour video screen or a printed page. The information that is forwarded to the display device to create the visual representation may differ according the type of display device so that the visual representation is produced in the best known suitable manner utilizing the advantages of the display device, and avoiding any disadvantages.

Examples of typical and useful output displays are given below.

Figure 4A:
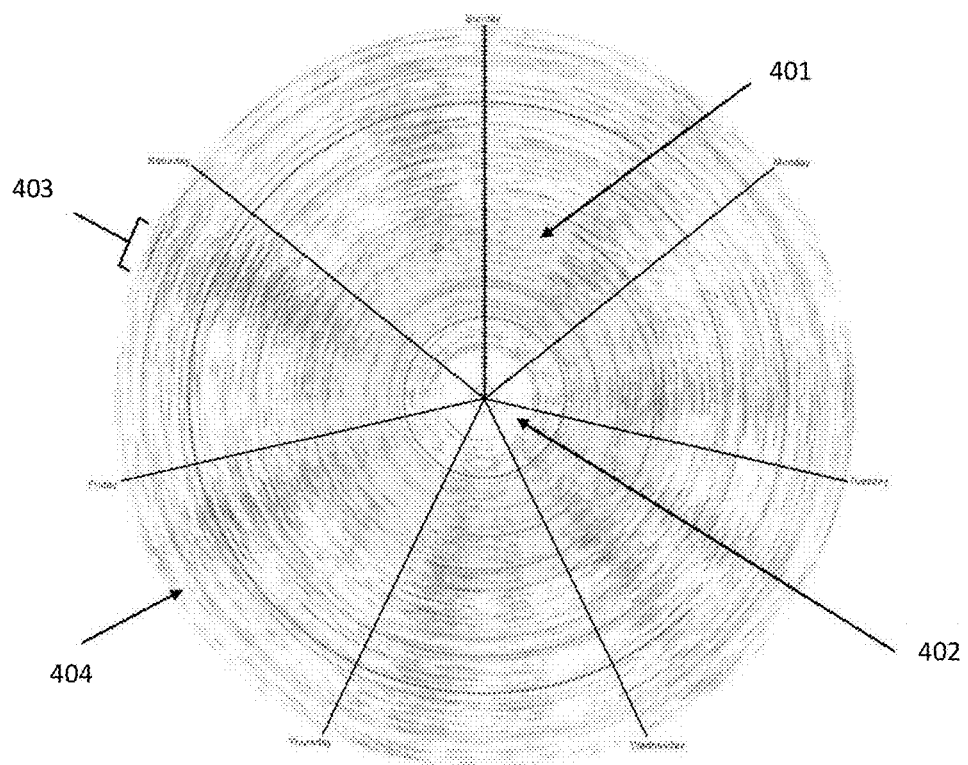
FIG. 4a shows an example of a generic spiral graph, with detail of features of interest shown within the graph.

FIG. 4a shows a generic spiral graph, with one complete spiral representing a week. Various features of interest within the spiral are displayed and can be assessed for interest or relevance against business metrics. 401 shows a 'disc' which suggests an abnormally long event. 'Hole' 402 suggests a lack of data. An 'arm' such as arm 403 suggests a cyclic or repeating pattern. A 'break' in an arm such as break 404 suggests a deviation from a pattern.

Figure 4B:
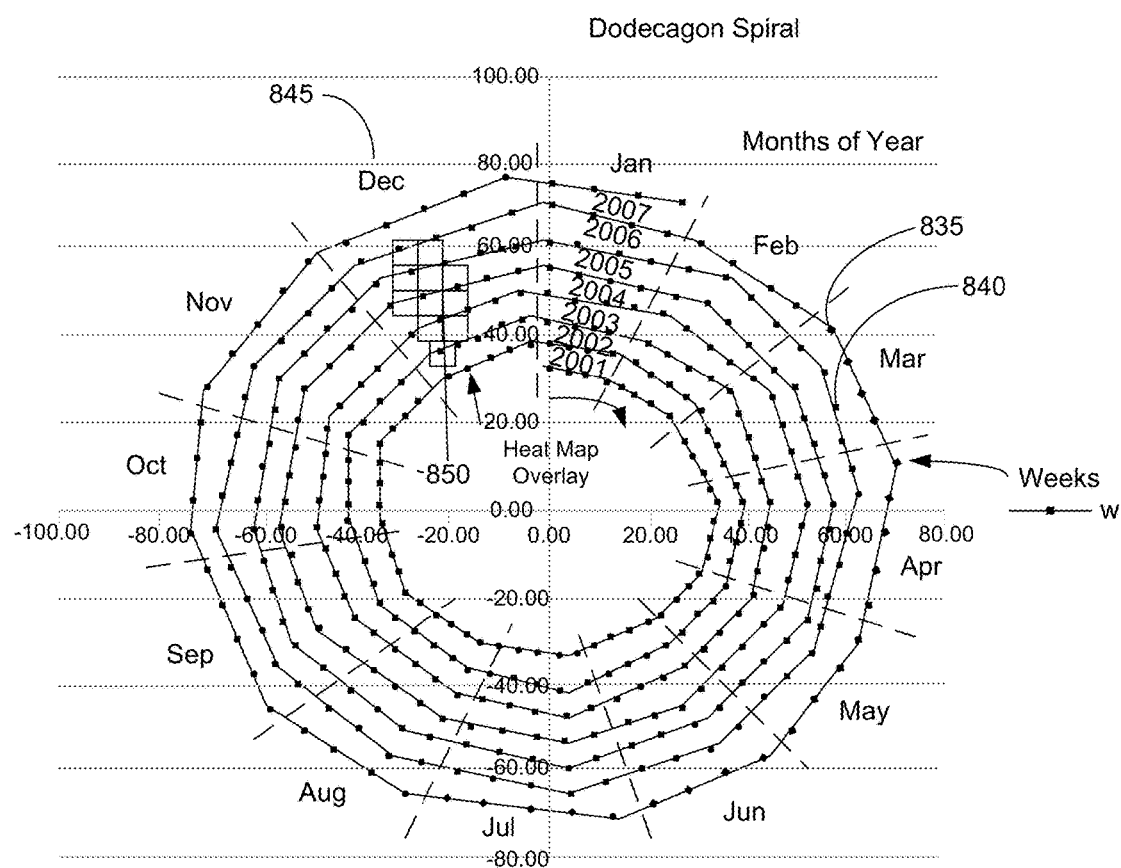
FIG. 4b shows an example of a visual document output, the output having the form of a dodecagon spiral.

FIG. 4b shows a dodecagon spiral which is useful for displaying data for a number of cyclic time periods, in this case years. Each year provides a successive layer on the spiral, where each year that passes is included as an outer layer. That is, the earlier years are towards the centre of the spiral, spiraling outwards with passing time. Two subsequent years are represented by the outer two rings 835 and 840, ring 840 representing the previous year to ring 835. In this case each month is allocated a radial slice of 30° (such as the month of December shown by arrow 845). Contraction or expansion adjustments are made within each month to conform to this constraint. Within months dates may be aligned so that the same dates are aligned for months of different length (i.e. April) or holidays are aligned etc. A heat map 850 is overlaid to reveal meaning between data for different years (e.g. sales levels or profitability).

Figure 4C:
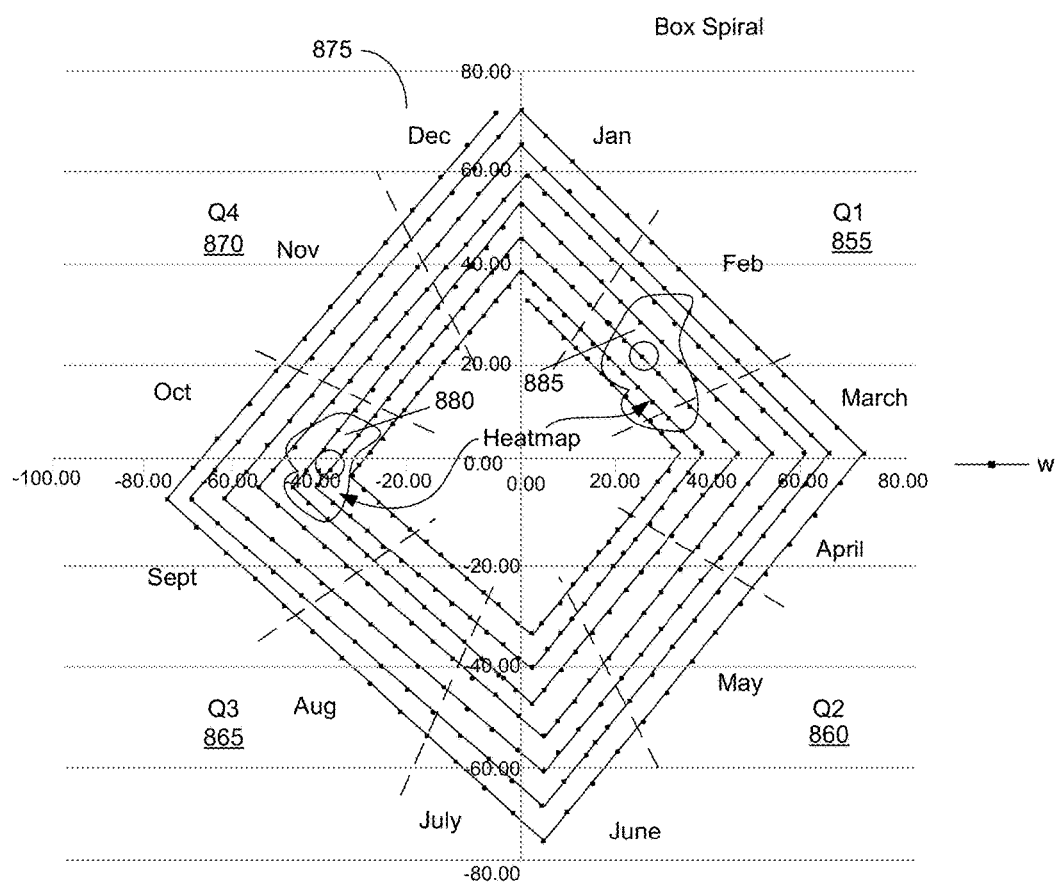
FIG. 4c shows a further example of the output taking the form of a dodecagon spiral.

FIG. 4c shows a box spiral variant in which the year is broken into four quarters, each represented by one side of a cube: 855 for the first quarter, 860 for the second quarter, 865 for the third quarter and 870 for the fourth quarter. Each month is allocated a radial slice of 30° (such as the month of December shown by arrow 875). Heat maps 880 and 885 are overlaid to reveal meaning between data for different years.

Figure 4D:
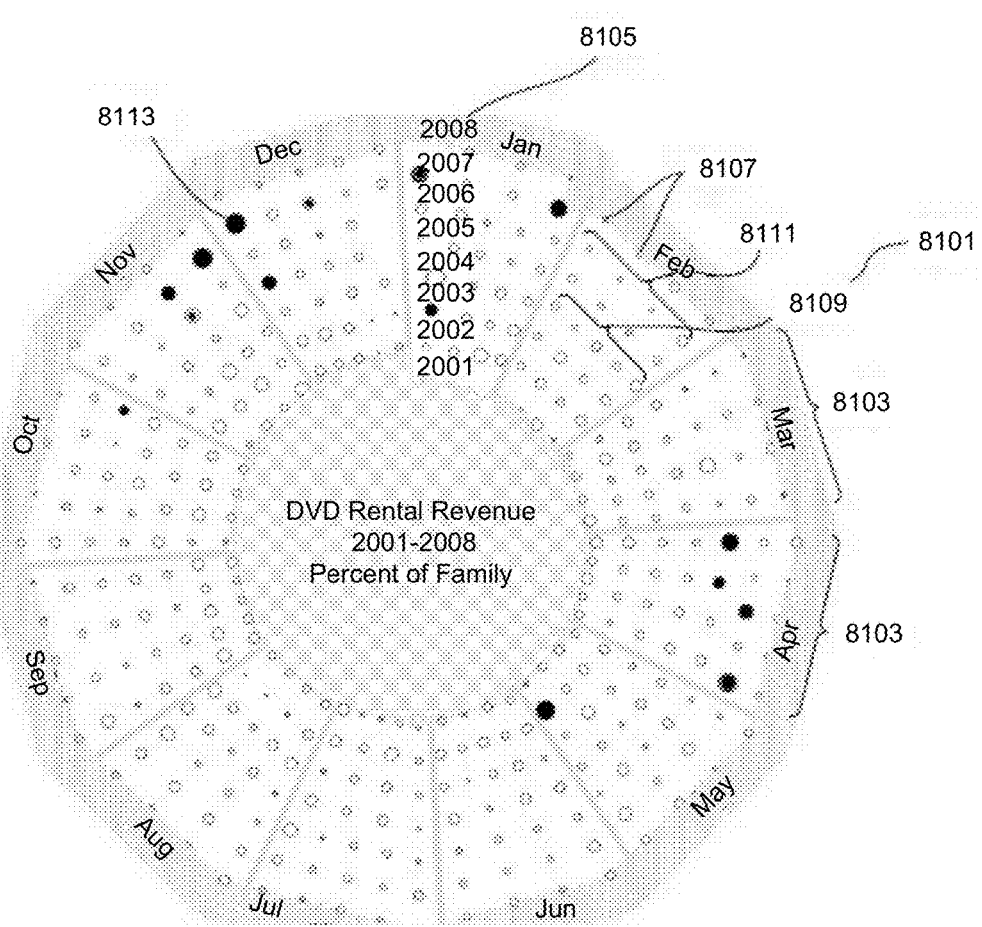
FIG. 4d shows an example of the visual document output as a box spiral or spiral plot.

FIG. 4d shows a dodecagon spiral 8101. The dodecagon spiral is represented as a dot density map, where each data point is represented by a dot, or circle.

The spiral depicts data on a month by month basis 8103 for a number of different years 8105. In this example, the data provided is weekly accounting data 8107 for film sales and rentals. Each weekly accounting period is represented by the weekly dots 8107. The data visually represents the spread of the revenue for the periods of interest. The spiral includes 12 months, January through to December, shown in a spiral format.

The maps in these figures show in a clear format the level of sales and rental activity throughout different time periods of the year. For example, in the map shown in FIG. 4d, revenue activity (sales and rentals) is tracked and plotted as circles of different sizes and shades. If activity beyond a predetermined limit occurs, the visual identity of the circle changes to denote the relative change in relation to the other plot points and to draw the attention of a users eye. For example, if the revenue received for a weekly accounting period exceeds a predefined monetary value, then a circle of a particular dimension and shade is displayed to depict that level of revenue. In general, the circles increase in size and darkness of shade for increased activity. A first level is depicted as a circle without any black filling, and a second higher level is depicted as circle with a black filling. Thus, a small black circle represents a higher revenue level than a large white circle, the largest black circles represent the highest revenue levels and the smallest white circles represent the lowest revenue levels. As an example, circle 8113 is clearly visually identifiable as high revenue item. The system can be programmed to include relevant data in each of the points or elements such as the individual circles as e.g. a pop-up or similar. A user can click on or hover over the circle, which would produce a detail data box showing relevant detail data such as individual sales figures. Further clicking could expand the thumbnail view further and could, for example, open a screen showing data for a particular location—sales data over time, network traffic data for individual users, etc.

As each month in each year is aligned, it is possible to see where similar peaks or troughs in activity occur throughout the months and years. The map in FIG. 4d could, for example represent film rental and sales activity, with sales data being gathered from physical retailers, and both rental and sales data being gathered from online streaming and download services. It can easily be seen from the change in map details that rental and sales activity around November and December gradually increases from 2003 onwards for these months, with the same levels of activity shown for April each year. Both of these time periods represent a key promotional period for the release of movies, so the alignment of sales and rentals to the relevant time periods can easily be identified in the pattern shown. It can further be seen that although there has been a shift in an end-users style of consumption from purchase and rental of a physical object—a DVD—from a rental outlet and either a high street or online store, to online streaming or downloading of a digital file as a rental or a purchase, this has not had a particularly noticeable effect on the overall pattern: activity still rises in the periods discussed, due to the promotional activities around these times. Overall sales data may differ (i.e. raw volume of sales and rentals). However, the pattern shows that promotional activity causes positive changes, which is a valuable business metric. The raw sales figures and trends therein can be analysed in a different manner.

In these examples, particular data patterns are easy for a user to identify, as they align and coincide with already existing and easy-to-recognise repeating time patterns (e.g. weeks, months and years). However, in the examples given above, the final display structure or visual output which is generated in step 307 is governed by underlying repeating temporal patterns that are pre-set independently of the mapping of any data. That is, the underlying 'scales' on the axes in the examples given above are based around an external calendar (days, months and years) which is used to dictate the underlying grid or pattern before any data has been retrieved and mapped onto the grid. As the data is force-mapped onto an existing grid or scale, patterns in the data which are not immediately visually striking to a user but which may nevertheless be of interest can be lost.

Figure 3B:
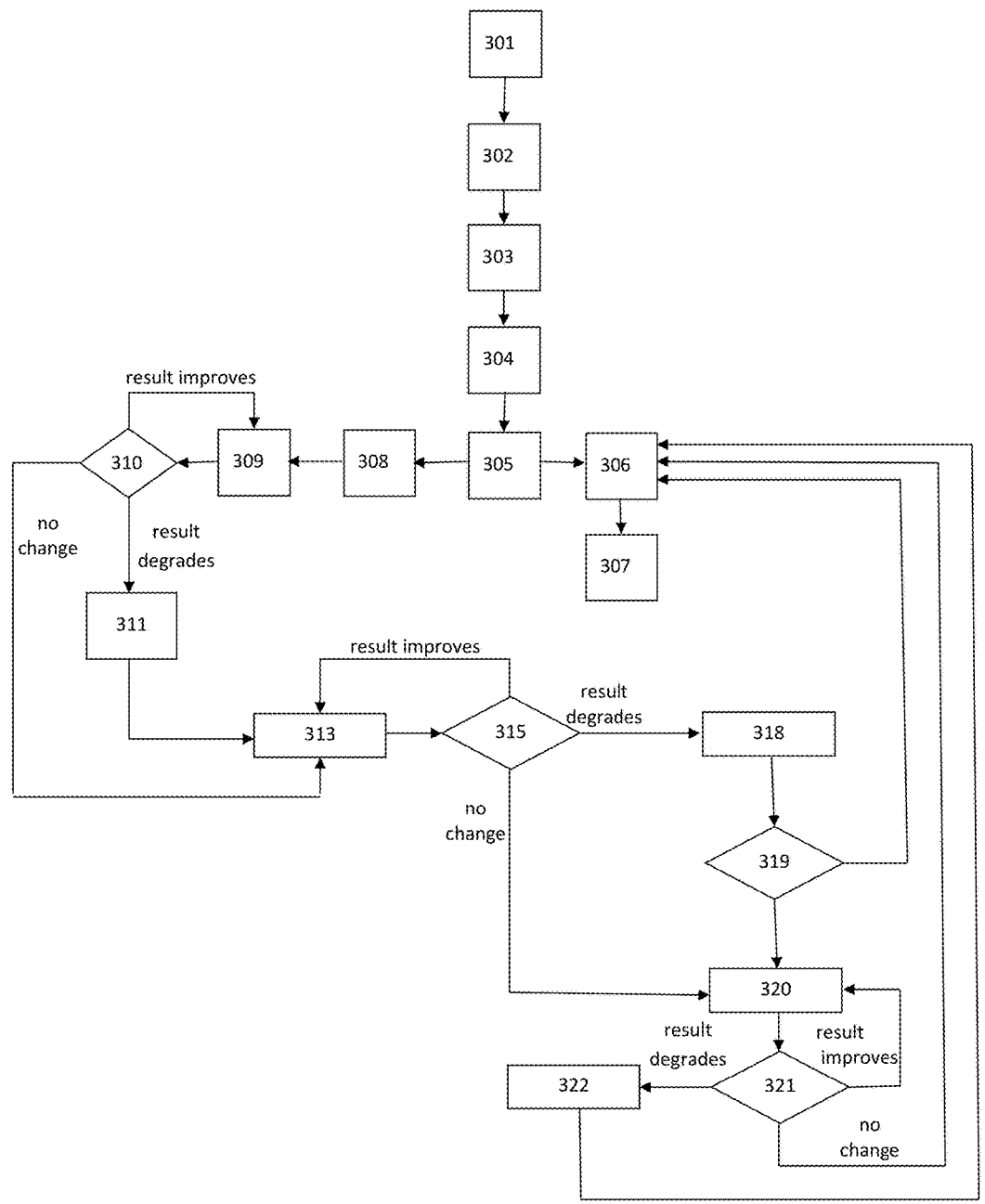
FIG. 3b shows an alternative flow diagram of the method according to embodiments of the present invention.

A modification of the flow chart of FIG. 3a is shown in FIG. 3b. This figure is similar to that shown in FIG. 3a, but has a number of additional steps. These steps will be described in detail below. In overview or the broadest terms, in the flow chart of FIG. 3a, the processing module 105 and rendering engine 106 create a 'final' Visual Document output by completing a single iteration. In the flow chart of FIG. 3b, this single iteration becomes a first iteration or first run-through of the data for potentially multiple iterations— there is at least one iteration of the data, and usually a number of subsequent iterations. In step 308, the processing module 105 assesses the result of the first iteration, searching for periodic patterns in the data as compared to a scale—e.g. a temporal scale. The processing module 105 can be instructed (or can default to) iterating or searching for a particular pattern or patterns, which are indicators of quality (in the sense of 'good', or 'beneficial'). Examples of 'good' or 'beneficial' patterns could include areas of high density, areas of low density ('sparseness'), clumping, contrast, etc.

Once a potential result or area is located, the processing module 105 will attempt to iteratively move the output towards a 'better' result. In step 309, the processing module 105 makes a primary iteration, adjusting the timescale in a particular manner. In step 310 an assessment is then made, with three possible outcomes: i) has the primary iteration improved the output, by moving the output towards the 'better' or more desirable output result; ii) has the result degraded; iii) has the result remained the same?

i) Result has Improved

If the result has improved, then a subsequent iteration will be carried out—step 309 will be repeated, adjusting the timescale in the same manner as before. This process continues until there is no improvement or result degrades or becomes worse than before the previous iteration.

ii) Result Degrades

If the result degrades—either immediately after the first iteration or any subsequent iteration carried out at step 309 and assessed at step 310, then the processing module 105 steps the result back at step 311. Further, smaller iterations at a lower level of change are then carried out at step 313.

A further assessment is then made at step 315. Again, there are three possible results: i) result improves, ii) result degrades iii) no change. If the result has improved, then the processing module 105 carries on iterating at this lower level at step 313 until the output degrades or plateaus, and then steps back at step 318 and assesses at step 319 to either cease iterating and render (at step 306), or to try again at a lower level of tertiary iteration (step 320), in a similar manner as before. Further assessment, stepping back etc are carried out in this tertiary loop at steps 321 and 322 respectively.

iii) Result Remains the Same

If the result remains the same, or there is no improvement or movement towards a 'good' result when the primary iteration takes place, then secondary and potentially tertiary iterations are carried out at steps 313 and 320 respectively.

As described above, the processing module 105 will carry out multiple iterations towards a 'good' result. The processing module will carry out one or more iterations at an initial level, and will step down the level of the iterations at least once based on feedback and assessment. Two lower levels of iteration are described—secondary and tertiary, although there could be further levels (e.g. quaternary, quinary, etc). The numbers and parameters of the iterations could be set by a user, or the processing module 105 could use default settings. A counter could also be used at the decision gates, the processing module 105 using the counter to assess how many iterations have taken place, and using this to assess whether to continue at a lower iteration level, or halt the process and finalise the visual document. For example, at step 319, the decision is to either render the Visual Document, or carry out tertiary iterations. The basis for this decision could be based on a count of previous iterations—if a certain number or combination of primary and secondary iterations have already been completed, this can be used to weight the decision.

In the herein described data visualisation or graphical analysis system, the modified data sets are arranged so that the graphical representation of a periodic event aligns with the graphical representation of other instances of the same periodic event. This graphical alignment ensures that the user can view the appropriate data associated with the events (and surrounding periods) in the correct context.

The temporal parameters in the query may be resolved using any of the techniques described above, wherein the temporal parameters are aligned through modification, restriction or expansion of the temporal parameters.

Another preferred method of rendering the output is to use a semi transparent overlay. One important technique with overlay may be to fade the colour or intensity in the background tree so that the visualisation data is highlighted.

A general method has been outlined above for producing an output or display that has been produced by assessing the data for a common temporal base and iteratively moving or altering the underlying axes, scale or similar to better display features arising from the common temporal base. Specific examples are described below to illustrate the method in use.

Network Traffic and Maintenance

Figure 5A:
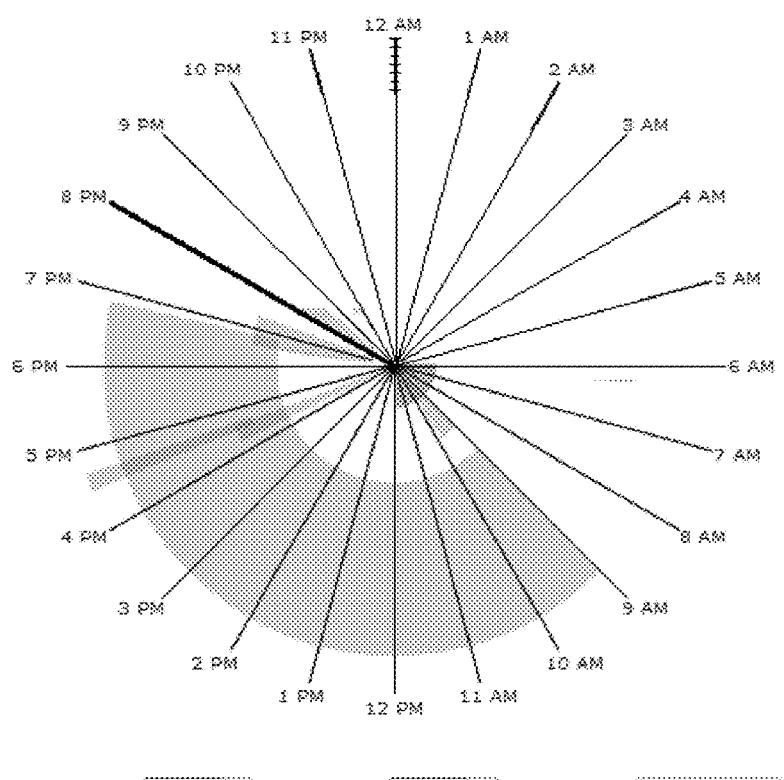
FIG. 5a shows an example of a specific spiral plot for network traffic over the course of a day.
Figure 5B:
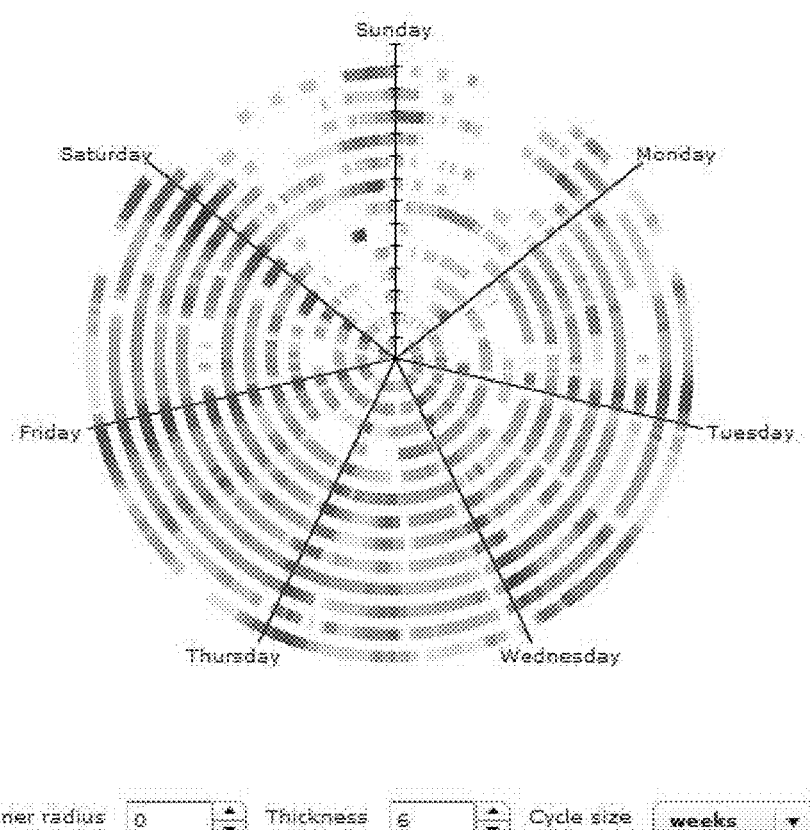
FIG. 5b shows an example of a specific spiral plot using the same data set as used for FIG. 5a, plotted over the course of a week.
Figure 6:
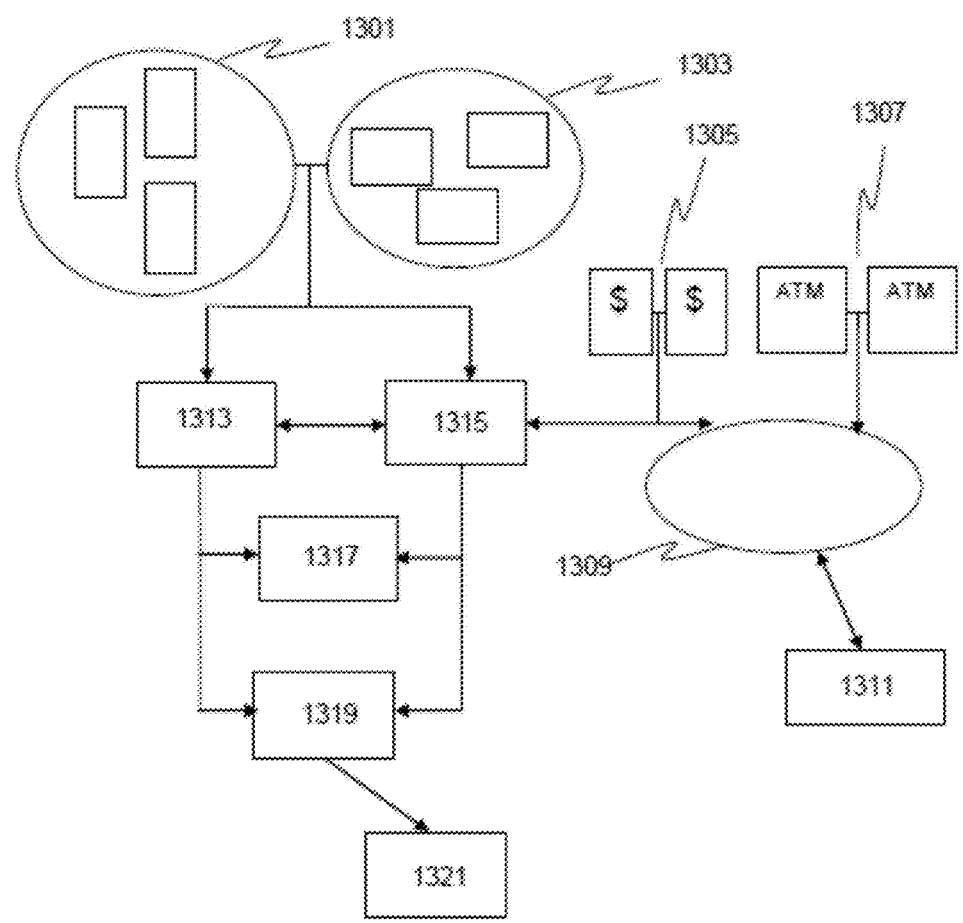
FIG. 6 shows a schematic view of a gaming environment with which the present invention may be used to produce visual document outputs of data gathered in the environment.

It is known to use temporal plots for assessment of traffic volumes and events on networks. A data set can be used to develop a plot which shows use over the course of days, weeks, months, etc. Examples of these plots are shown in FIGS. 5a and 5b. FIG. 5a shows an example of a specific spiral plot for network traffic over the course of a day. FIG. 5b shows an example of a specific spiral plot using the same data set as used for FIG. 5a, plotted over the course of a week. In these particular examples, the plot represents network traffic over a data network—e.g. internet use. The geographical location is the CBD of a city, the network traffic taking place within, and into/out of the CBD. If electricity use, or the use of a mobile telephone network was plotted, the result would be similar. As can be seen, and as is to be expected, generally the heaviest use of the network takes place during office hours (see FIG. 5a), ramping up from 9.00 am onwards, remaining heavy and consistent through the day, and tailing off into the evening, with little to no activity through the night until the next day. As can be seen when plotting activity over the course of a week (FIG. 5b), the majority of the activity takes place between Monday and Friday, and there is much less activity over the weekend. This type of activity fits the usual and anticipated pattern, and can be used to schedule various events. For example, certain portions of a network can be put on standby overnight, or taken out of use for maintenance. If maintenance is required that might take longer than a night or evening, this can be scheduled to take place over a weekend. For an environment with a high density of offices, there are unlikely to be significant unforeseen events if data is plotted over a month or year, as most offices are '9 to 5' environments irrespective of season. There may be an annual holiday shutdown for significantly longer than a weekend, or there may be a gradual shift in power usage with the turn of the seasons.

However, there may also be other events, either scheduled or predicted, which occur regularly, but where the periodicity of the event falls outside the regular rhythm of working weeks. For example, all networks rely on nodal distribution: in a mobile network, the nodes are cell phone towers. In an electricity grid, the nodes are step-down transformers or similar connections between the main power lines and the internal networks within buildings. These items will have regular maintenance schedules, which may involve shutdown for a period of time. There are also critical items or nodes within any network that have a Mean Time Between Failures (MTBF) that means they will require maintenance or replacement at intervals that fall outside a regular daily, weekly, monthly or annual rhythm. One-off events or isolated single occurrences can be dealt with relatively easily—a node can be temporarily removed from the network and traffic routed through the remainder of the grid. However, two or more events may overlap or occur simultaneously. This can potentially leave certain areas without service at a critical time, or potentially overload other portions of the grid and cause problems. An electricity grid may overload in certain areas and shut down. A cell phone network could overload from call/traffic volume, and refuse additional incoming or outgoing calls. Local internet could fail or become unacceptably slow. This could potentially cause much loss to businesses in the affected area.

One way in which the present invention can be used is to predict, and subsequently manage and schedule these events.

In a first example embodiment, the present invention is used to predict system failure and schedule preventative maintenance. For a network in a city, it is likely that the network has grown in an at least semi-organic fashion: as the city grows, different types or styles of particular equipment are installed to carry out the same task, the demands on a particular node are different from others in the network (e.g. volume of traffic) creating a different maintenance periodicity, the installation of particular nodes takes place at different times from others in the network. Although failure of a single node may be easy to compensate for by routing traffic around the outage, failure of more than one node within a certain time period could result in an outage within a certain geographical location. The MTBFs for a number of geographically adjacent nodes are used as the data elements to produce the plot. The processing module 105 creates the output used for the spiral plot as outlined above. Also as outlined above in the general description, the processing module 105 searches for common periodicities in the separate plotted data elements, and iterates towards these. The axes of the time plot are altered as the iterations are carried out and completed, so that common temporal events align to produce an output that is visually distinctive—for example an 'arm' extending radially on the plot. An 'arm' is caused by a number of cyclical events coinciding regularly. In this case, a number of MTBFs may be coinciding at a regular interval that would not be immediately obvious without iteration of the plot towards the common regular interval (the interval could be for example between five and seven weeks, or another similar interval that lies outside a regular weekly/monthly schedule). As this coinciding may pose an unacceptable risk, a maintenance/replacement schedule can be devised which avoids the risk of several simultaneous failures, or simultaneous maintenance downtime. The method of the present invention can be used to develop a suitable schedule by iterating towards a time period where few or no events are scheduled. Other relevant data can be plotted simultaneously to ensure that everything runs smoothly—for example regular events such as weekends, and other semi-regular or one-off events such as sporting events, parades, road works, etc. can be plotted to ensure that taking portions of a network offline, or carrying out potentially disruptive maintenance, will not interfere with other events or regular/normal use of the network.

In a second example embodiment, the method of the invention can be applied in order to predict and schedule other potential events. Spiral plots such as those already described have a set temporal frequency (e.g. a 24 hour day in FIG. 5a, and the seven-day week in FIG. 5b). Traffic data is plotted on to the set temporal spiral. In this particular embodiment, other data is also plotted. This data could relate to: maintenance and MTBFs for critical nodes in the network, known forthcoming regular events (e.g. a business district may regularly have an increased evening network usage at the end of a month, or at the end of the financial year), road maintenance or other known scheduled future events which might necessitate the shutting down of a geographically local node or nodes can be added to the plot.

The processing module 105 produces the output used for the spiral plot. As outlined above in the general description, the processing module 105 also searches for common periodicities in the separate plotted data elements, and iterates towards these. The axes of the time plot are altered as the iterations are carried out and completed, so that common temporal events align to produce an output that is visually distinctive—for example an 'arm' extending radially on the plot. The 'arm' might be caused by a number of cyclical events coinciding regularly. As an example, the end of a financial year might coincide with scheduled road maintenance that requires shutting down one or more grid nodes, with both of these events coinciding with the predicted MTBF of an adjacent node or nodes which are scheduled to carry the additional load from the nodes which have been shut down. As this would almost certainly pose an unacceptably high risk, the scheduled maintenance can be postponed or brought forward in order to mitigate risk.

For both of the examples given above, the plot can be overlaid onto other data layers in order to produce an optimum result. For example, onto a physical map, or a stylised representation (e.g. a map of the grid in question). A heatmap layer showing actual traffic volume through certain portions of the grid in either the physical or stylised form could also be used as an over- or under-laid output layer.

Gaming Environment

FIG. 5 shows an example of how the herein described system may be incorporated within a gaming environment. The gaming environment consists of a number of gaming machines 1301 and electronic tables 1303 (among other electronic gaming devices) that are adapted to communicate electronically with other systems using any suitable protocols, such as data packet protocols.

The gaming environment further includes a number of electronic cashier devices 1305 and ATMs 1307 which are in communication via a Wide Area Network 1309 with one or more financial databases 1311.

Data from the gaming machines 1301 and electronic tables 1303 are transferred to a reward program database 1313 and customer database 1315. It will be understood that these two databases may be combined into a single database.

Data from the cashier devices are also transferred to the reward program database 1313 and customer database 1315. The databases 1313 and 1315 are in communication with a central hotel management system 1317 that oversees the operation of the gaming environment, including the activities of customers in other areas of a casino, such as shops, hotels, spas etc.

The system 1319 described herein is in communication with the reward program database 1313, customer database 1315 and central hotel management system 1317 so the system can retrieve all necessary data about the activities within the gaming environment. The various embodiments as described herein are employed by the system 1319 to provide an output 1321.

Certain events may occur periodically within this environment. Some of these occur regularly and can be easily foreseen, with necessary actions taking place to compensate or otherwise ensure the smooth running of a business. For example, it is likely that there will be a greater volume of business on Friday and Saturday nights, and that the last Friday of each month will be particularly busy. Holidays such as New Years or Christmas occur regularly and can be taken into account. There are other holiday events that occur irregularly—for example Easter takes place each year, but the exact date of Easter can vary by as much as a month as it is based on other periodic factors such as the full moon. These known events, both regular and semi-regular can plotted for business strategy planning.

However, there may be other regularly occurring events that are not immediately obvious within an axis or axes that are temporally fixed using an initial regular repeating scale such as weeks or months. For example, certain individuals or groups may visit regularly but at intervals that do not align with a weekly/monthly scale—for example, a regular visit every five or seven weeks, and the gaming venue could see a spike in play or sales as a result. These could be the result of visits by high-rollers such as a businessman or businessmen on regularly scheduled local visits who visit in their down time, or another group such as a sports team, fishing fleet crew of similar whose work schedule is less regular, and who may have large amounts of disposable income on their regular or semi-regular visits. Identifying the periodicity of these events is useful when planning and allows appropriate preparations to be made—additional staff can be rostered on, additional supplies ordered in advance, private or luxury areas can be freed up, etc.

As before, these periods are identified by having the processing module 105 search for common periodicities in the separate plotted data elements, and iterating towards these. The axes of the time plot are altered as the iterations are carried out and completed, so that common temporal events align to produce an output that is visually distinctive—for example an 'arm' extending radially on the plot. The result could be output as a spiral plot, or as a linear plot on an x-y graph, with representing time passing and 'y' revenue. Spikes would occur on the 'y' axis at intervals. As these are easily visually distinguishable on the plot, these can be investigated and assessed further easily.

FURTHER EMBODIMENTS

It will be understood that the embodiments of the present invention described herein are by way of example only, and that various changes and modifications may be made without departing from the scope of invention. It will be understood that any reference to displaying a visual representation on a screen equally applies to storing that representation or printing the representation onto any suitable medium. As explained above, the data used to display, store or print may be adjusted by the system according to the purpose of the data.

Further, it will be understood that any references in this document to any modules, engines or associated processing, analysis, determination, or other steps, may be implemented in any form. For example, the modules or engines may be implemented, and the associated steps may be carried out, using hardware, firmware or software.

While the present invention has been illustrated by the description of the embodiments thereof, and while the embodiments have been described in detail, it is not the intention of the Applicant to restrict or in any way limit the scope of the appended claims to such detail. Further, the above embodiments may be implemented individually, or may be combined where compatible. Additional advantages and modifications, including combinations of the above embodiments, will readily appear to those skilled in the art. Therefore, the invention in its broader aspects is not limited to the specific details, representative apparatus and methods, and illustrative examples shown and described. Accordingly,

What we claim is:

1. In a graphical analysis computing system, a method of arranging a data set for graphical analysis, the method comprising the steps of:
   retrieving data elements from a data store that forms part of or which is in communication with the graphical analysis computing system;
   carrying out a preliminary analysis of the retrieved data;
   selecting an initial visual document framework, based on the preliminary analysis;
   mapping the data onto the visual document framework;
   determining visual attributes of the data when mapped onto the visual document framework by carrying out an analysis of the data when mapped onto the visual document framework for a particular pattern or patterns, which are indicators of quality, wherein the indicators of quality are selected from one or more of the group consisting of areas of high density, areas of low density, clumping, and contrast;
   adjusting the visual document framework based on the analysis of the data to emphasize desired visual attributes by adjusting the visual document framework until there is no improvement in the desired visual attributes, using multiple iterations, wherein a primary iteration, and subsequent iterations of identical level of change to the primary iteration are carried out, and further including the step of assessing the result after each iteration until there is no improvement in the result or the result degrades and further including the step of stepping the result back if the result has degraded; and
   rendering a visual document from the adjusted visual document framework on an output display.

2. The method of arranging a data set as claimed in claim 1 wherein the default visual document framework is a spiral plot.

3. The method of arranging a data set as claimed in claim 2 wherein the desired visual attribute is radial concentration.

4. The method of arranging a data set as claimed in claim 2 wherein the desired visual attribute is radial sparseness.

5. The method of arranging a data set as claimed in claim 1 wherein the desired visual attribute is clumping.

6. The method of arranging a data set as claimed in claim 1 wherein the desired visual attribute is contrast.

7. The method of claim 1 having the further step of carrying out a secondary iteration of a lower level of change than the primary iteration, and subsequent iterations of identical level of change to the secondary iteration, and further including the step of assessing the result after each iteration until there is no improvement in the result or the result degrades.

8. The method of claim 7 having the further step of stepping the result back if the result has degraded.

9. The method of claim 7 having the further step of carrying out a tertiary iteration of lower level of change than the secondary iteration, and subsequent iterations of identical level of change to the tertiary iteration, and further including the step of assessing the result after each iteration until there is no improvement in the result or the result degrades.

10. The method of claim 9 having the further step of stepping the result back if the result has degraded.

* * * * *